United States Patent [19]
Rydborn

[11] Patent Number: 5,216,317
[45] Date of Patent: Jun. 1, 1993

[54] CONVERTER APPARATUS

[76] Inventor: Sten A. Rydborn, Klöxhultsvägen 21, 343 00 Älmhult, Sweden

[21] Appl. No.: 779,282

[22] Filed: Oct. 18, 1991

[51] Int. Cl.[5] .............................................. H01L 41/08
[52] U.S. Cl. ................................... 310/366; 310/321; 310/345; 310/340; 310/339; 310/319
[58] Field of Search ............... 310/316, 317, 319, 800, 310/321-324, 366, 345, 338, 339, 348, 365, 340

[56] References Cited

U.S. PATENT DOCUMENTS

| | | | |
|---|---|---|---|
| 2,155,035 | 4/1939 | Bieling | 310/355 |
| 2,323,610 | 7/1943 | Koch | 310/366 |
| 3,909,641 | 9/1975 | Ohshima et al. | 310/366 X |
| 4,193,010 | 3/1980 | Kompanek | 310/321 X |
| 4,451,710 | 5/1984 | Taylor et al. | 310/800 UX |
| 4,739,211 | 4/1988 | Strachan | 310/321 |
| 4,857,887 | 8/1989 | Iten | 310/340 X |
| 4,969,197 | 11/1990 | Takaya | 310/345 X |

Primary Examiner—Mark O. Budd
Attorney, Agent, or Firm—Antonelli, Terry, Stout & Kraus

[57] ABSTRACT

An apparatus for converting a mechanical force into an electrical signal. The apparatus includes a piezoelectric disk crystal (1), connecting electrode layers (2, 3) disposed on opposite sides of the disk-shaped crystal (1), the electrode layer (3) on the one side being divided into a transmitter electrode layer (6) and a ground or o-electrode layer (5), and the electrode layer (2) on the opposite side being divided into a receiver electrode layer (7) and a ground or o-electrode layer (8).

7 Claims, 1 Drawing Sheet

CONVERTER APPARATUS

BACKGROUND OF THE INVENTION

The present invention relates to an apparatus for converting a mechanical effect into an electric signal, the apparatus including a disk-shaped element with piezoelectric properties, a so-called piezoelectric crystal.

Prior art apparatuses for converting a mechanical effect or influence into an electrical signal comprise, as mentioned above, an element of a piezoelectric ceramic material, a so-called piezoelectric crystal, which may be caused to oscillate with different modes, the oscillation being influenced by the mechanical force, and the change giving a signal change which is a measure of the influencing mechanical force. One major object within this art is to improve and refine arrangements of this type with a view to achieving a simpler arrangement but one that at the same time is more sensitive and rapid.

The task forming the basis of the present invention is to satisfy the above-outlined objects.

SUMMARY OF THE INVENTION

This task is solved according to the present invention in that the apparatus disclosed by way of introduction is characterised in that connecting electrode layers are disposed on opposing sides of the disk-shaped element, that the electrode layer on one side is divided into a transmitter electrode layer and a ground or o-electrode layer, and that the electrode layer on the other, opposing side is divided into a receiver electrode layer and a ground or o-electrode layer. The electrode layer is divided diagonally from the one corner to the opposing corner for the formation of triangular electrode layer, the hypotenuses being located adjacent one another. An electrical conductor is secured, preferably soldered, to the triangular electrode layer. At least the anchorage point of the electrical conductor on the transmitter electrode layer is placed at a distance from the longitudinal sides and short side of the elements suitable for achieving desired oscillation, preferably substantially midway of the longitudinal sides and 0.27 times the length of the element, respectively. The anchorage point of all of the electrical conductors has the same placing on its electrode layer as the conductor of the transmitter electrode layer. The disk-shaped element with conductors is housed in a casing of a suitable flexible material, preferably silicon rubber, etc., with such orientation that a part of the element, preferably the one longitudinal side edge is located beneath an elevation which is intended to be subjected to the mechanical force which is to influence the elements and be converted into an electrical signal, while the opposing longitudinal side edge rests on the bottom of the casing. The transmitter electrode layer is connected to means for excitation of the disk-shaped element into mechanical oscillation, preferably resonance oscillation, and the receiver electrode layer is connected to means for indication of the oscillation of the element and/or possible modifications to the oscillation because of the disk-shaped element being exposed to mechanical strain which is to be indicated. The means for excitation of the disk-shaped element include a non-inverting operational amplifier coupled to a supply circuit, preferably +15 V and −15 V, the output of the amplifier being fed back to the negative input via a capacitor coupled in parallel with a resistor, and is connected to the electrical conductor which is secured on the transmitter electrode layer, and whose positive input is connected to the electrical conductor which is secured on the receiver electrode layer, and to indication means, the negative input being connected to ground (earth) or neutral conductor via a resistor.

The present invention provides a design of small dimensions and with extraordinary properties. The simplicity of its design further entails great reliability and extreme versatility in use. The sensitivity of an apparatus according to the present invention is, of course, somewhat dependent upon the electronics employed for signal indication, but trials have demonstrated that an apparatus according to the present invention permits the sensing of forces or weights of 0–50 grams with a sensitivity of a thousandth of a gram even better, and a rapidity of reaction of better than 1 ms. A suitable practical application of an apparatus according to the present invention is in a thread brake in textile machines for regulating the thread brake in response to the tension in the thread which acts on the apparatus according to the present invention.

BRIEF DESCRIPTION OF THE DRAWINGS

One embodiment of the present invention will be described in greater detail hereinbelow with particular reference to the accompanying drawings.

DETAILED DESCRIPTION OF A PREFERRED EMBODIMENT

Figure 1:
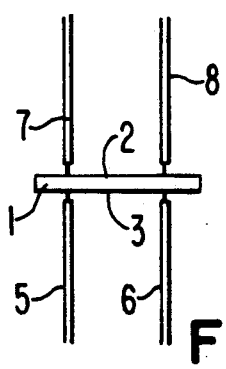
FIG. 1 is a top plan view of a part of an apparatus according to one embodiment of the present invention.

The embodiment of the present invention shown in the drawings comprises a disk-shaped, piezoelectric crystal 1 which, in the present embodiment, is rectangular, with a certain length, height and thickness. The length and height are considerably greater than the the thickness. On the two opposing side surfaces, there are disposed an electrode layer 2 on the one side and an electrode layer 3 on the other, opposing side. These electrode layers 2, 3 are substantially of the same configuration as the disk 1 but do not extend out to the contours of the disk 1. The two electrode layers 2 and 3 are divided by means of a diagonal 4 (FIG. 3) extending from one corner to the opposing corner. The diagonal 4 divides each electrode layer 2, 3 into two triangular electrode layers which are located adjacent one another along the hypotenuse which is formed by the diagonal 4. On the two electrode layers, the diagonal 4 extends from the same corner so that the diagonals on the two electrode layers 2 and 3 lie in line with each other.

Figure 3:
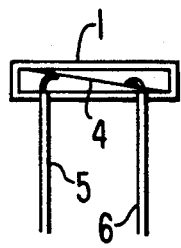
FIG. 3 is a side elevation of the part shown in FIGS. 1 and 2.

As is apparent from FIG. 3, the left-hand lower, triangular portion of the electrode layer 3 is provided with a ground (earth) or o-conductor 5, while the upper, right-hand, triangular portion of the electrode layer 3 is provided with a transmitter conductor 6. The electrode layer 2 on the opposite side has the right-hand lower, triangular portion of the electrode layer 2 provided with a receiver conductor 7, while the opposing left-hand, triangular lower portion of the electrode layer 2 is provided with a o or ground conductor 8 when observing the electrode layer 2 from the front.

The placement of the solder points of the conductors 5-8 on the triangular electrode layers has proved to be of importance and, in the present embodiment, it has proved suitable to place the solder points for the conductors at a distance 0.27 times the length of the disk 1 from the end of the disk and midway of the longitudinal side edges of the disk.

Figure 4:
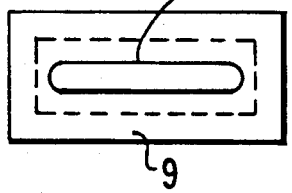
FIG. 4 is a top plan view of a casing for the part illustrated in FIGS. 1–3.
Figure 7:
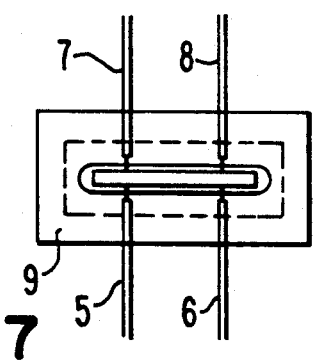
FIG. 7 is a view from beneath of the upper portion of the casing of FIGS. 4 and 6 and the part shown in FIGS. 1–3.
Figure 6:
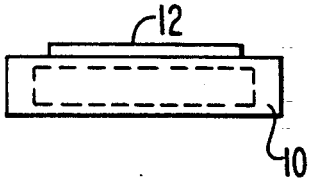
FIG. 6 is a side elevation of the casing of FIGS. 4 and 5.
Figure 8:
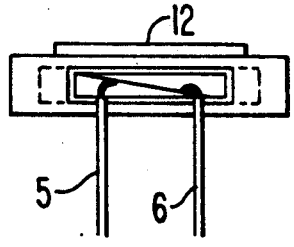
FIG. 8 is a side elevation of the casing illustrated in FIG. 6, with the part according to FIGS. 1–3 mounted in place, and a part of the casing removed for purposes of illustrative clarity.
Figure 2:
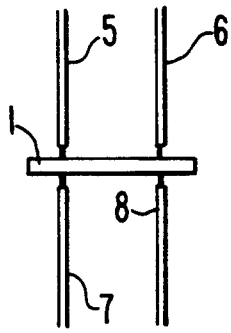
FIG. 2 is a similar view from the opposite side.
Figure 5:
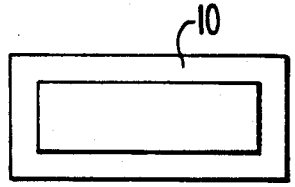
FIG. 5 is a top plan view of a lower portion of the casing illustrated in FIG. 4.

The portion of an apparatus according to the present invention illustrated in FIGS. 1-3 is advantageously placed in a casing according to FIGS. 4-6, as illustrated in FIGS. 7 and 8. The casing consists of an upper portion 9 and a lower portion 10 and, on assembly of the two casing portions 9 and 10, there is formed therein a space 11 for the part shown in FIGS. 1-3. The casing portion 9 has an elevation 12 which, as is apparent in FIGS. 7 and 8, is located straight above the one longitudinal side edge of the part illustrated in FIGS. 1-3 which, besides, rests on the bottom of the lower portion 10. After insertion of the part illustrated in FIGS. 1-3 according to FIGS. 7 and 8, the casing portions 9 and 10 are glued together with a suitable glue and, ideally, the casing portions 9 and 10 may be manufactured from a suitable elastic material, for example silicon rubber. The elevation 12 substantially serves to distribute any possible mechanical force throughout the entire longitudinal side edge of the disk 1.

Figure 9:
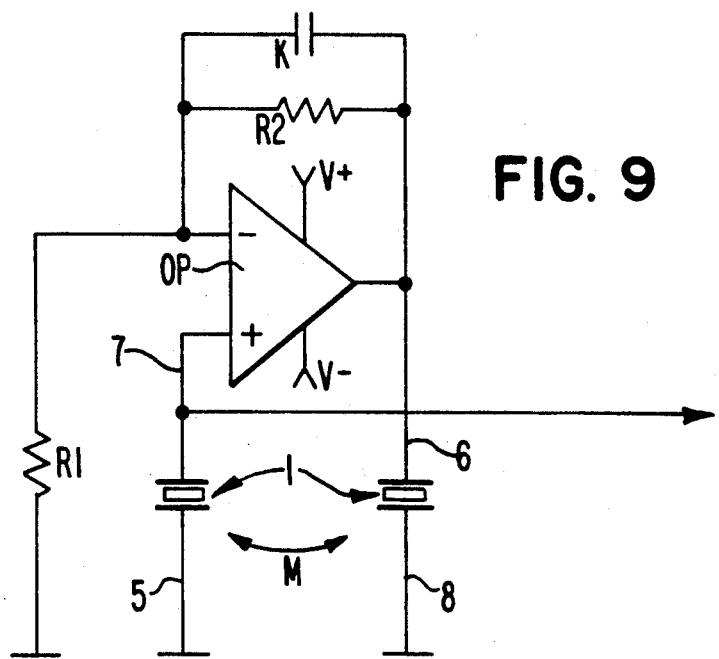
FIG. 9 shows a simplified diagram for an apparatus according to the present invention.

FIG. 9 shows a simplified diagram for the apparatus described in the foregoing. The ground and o conductors 5 and 8 are coupled to a o-bar or neutral bar. The negative input of a non-inverting operational amplifier OP is coupled to ground or a neutral conductor via a resistor R1, while the output of the amplifier OP is fed back to its negative input by means of a capacitor K connected in parallel with a resistor R2. The positive input of the operational amplifier is coupled to the receiver conductor 7, while the transmitter conductor 6 is coupled to the output of the operational amplifier. That signal which it is desirable to monitor, indicate or handle in any other suitable way also occurs on the receiver conductor 7.

In a prototype according to the present invention whose disk had the dimensions length 12 mm, height 2.5 mm and thickness 1.5 mm, a resonance frequency of 40 Hz was imparted to the transmitter conductor 6. The apparatus becomes resonant and the oscillation mode which is applied in the present case is the so-called "shear-mode".

With the aid of the casing in FIGS. 4-6, the disk 1 will be protected against dirt, dust and the like. Furthermore, the casing possesses the capability of distributing the pressure on the crystal and can, therefore, be considered as being included as an active part in the apparatus. The apparatus illustrated in FIGS. 7 and 8 is placed on a substantially smooth and hard substrate, with the elevation pointing upwardly for exercising the mechanical force thereon.

Many modifications and alterations are, naturally, conceivable without departing from the spirit and scope of the inventive concept as defined in the appended claims.

I claim:

1. An apparatus for converting a mechanical effect into an electric signal, the apparatus comprising a rectangular piezoelectric element; a first electrode layer on a first side of the piezoelectric element and divided diagonally from one corner thereof to the opposite corner thereof to form a triangular transmitter electrode portion and a first triangular ground electrode portion, with the hypotenuses of the triangular transmitter electrode portion and the first triangular ground electrode portion adjacent each other; and a second electrode layer on the opposing side of the piezoelectric layer and divided diagonally from one corner thereof to the opposite corner thereof to form a triangular receiver electrode portion and a second triangular ground electrode portion, with the hypotenuses of the triangular receiver electrode portion and the second triangular ground electrode portion adjacent each other.

2. The apparatus as claimed in claim 1, further comprising an electrical conductor secured on each triangular electrode portion.

3. The apparatus as claimed in claim 2, wherein the electrical conductor secured on the triangular transmitter electrode portion is positioned at a location substantially midway between the longitudinal sides of the rectangular piezoelectric element and spaced from the base of the triangular transmitter electrode portion a distance 0.27 times the length of the rectangular element.

4. The apparatus as claimed in claim 3, wherein each of the electrical conductors is positioned on its respective triangular electrode portion at a location substantially midway between the longitudinal sides of the rectangular piezoelectric element and spaced from the base of the triangular electrode portion a distance 0.27 times the length of the rectangular piezoelectric element.

5. The apparatus as claimed in claim 4, further comprising a flexible casing member housing the rectangular piezoelectric element therein, and an elevated portion on the casing member, with one longitudinal side edge of the rectangular piezoelectric element located beneath the elevated portion, for distributing mechanical force which influences the element and is converted into an electric signal.

6. The apparatus as claimed in claim 1, further comprising means coupled to the transmitter electrode portion for exciting the piezoelectric element with a mechanical oscillation; and means coupled to the receiver electrode portion for indicating the oscillation or change in oscillation of the piezoelectric element due to the piezoelectric element being exposed to a mechanical force which is to be indicated.

7. The apparatus as claimed in claim 6, wherein the means for exciting the piezoelectric element include a non-inverting operational amplifier adapted to be coupled to a supply circuit, the negative input of the amplifier being coupled to ground or to a neutral conductor via a first resistor, and the output of the amplifier being fed back to the negative input of the amplifier via a capacitor coupled in parallel with a second resistor and being connected to an electrical conductor secured to the transmitter electrode portion, the positive input of the amplifier being coupled to an electrical conductor secured to the receiver electrode portion and to indicator means.

* * * * *